United States Patent
Döring

(10) Patent No.: US 10,258,064 B2
(45) Date of Patent: Apr. 16, 2019

(54) PROCESS FOR THE PRODUCTION OF NEAR STERILE WHEY PROTEIN CONCENTRATES

(71) Applicant: DMK Deutsches Milchkontor GmbH, Zeven (DE)

(72) Inventor: Sven-Rainer Döring, Zeven (DE)

(73) Assignee: DMK Deutsches Milchkontor GmbH, Zeven (DE)

(*) Notice: Subject to any disclaimer, the term of this patent is extended or adjusted under 35 U.S.C. 154(b) by 327 days.

(21) Appl. No.: 15/175,661

(22) Filed: Jun. 7, 2016

(65) Prior Publication Data
US 2016/0360771 A1 Dec. 15, 2016

(30) Foreign Application Priority Data
Jun. 13, 2015 (EP) .................................. 15172002

(51) Int. Cl.
| | |
|---|---|
| *A23C 21/00* | (2006.01) |
| *A23C 3/02* | (2006.01) |
| *A23J 1/20* | (2006.01) |
| *B01D 61/14* | (2006.01) |

(Continued)

(52) U.S. Cl.
CPC .................. *A23J 1/205* (2013.01); *A23C 1/04* (2013.01); *A23C 3/02* (2013.01); *A23C 9/1425* (2013.01); *A23C 21/00* (2013.01); *A23J 1/20* (2013.01); *B01D 61/142* (2013.01);
(Continued)

(58) Field of Classification Search
CPC .... A23J 1/20; A23J 1/205; A23C 1/04; A23C 3/02; A23C 9/1425; A23C 21/00; A23C 2210/204; A23C 2210/208; B01D 61/142; B01D 61/147
See application file for complete search history.

(56) References Cited

U.S. PATENT DOCUMENTS

| | | | | |
|---|---|---|---|---|
| 6,120,820 A | * | 9/2000 | Brody | ........................ A23L 5/49 426/253 |
| 8,920,861 B2 | * | 12/2014 | Lehmann | ............. A23C 9/1425 426/478 |

(Continued)

FOREIGN PATENT DOCUMENTS

| | | |
|---|---|---|
| EP | 1 046 344 A2 | 10/2000 |
| EP | 2 497 368 A1 | 9/2012 |
| EP | 2 661 968 A1 | 11/2013 |

(Continued)

OTHER PUBLICATIONS

Smithers et al. Advances in Dairy Ingredients. 2013. pp. 1-29.*

*Primary Examiner* — Anthony J Weier
(74) *Attorney, Agent, or Firm* — Dilworth & Barrese, LLP

(57) ABSTRACT

A method for production of near sterile whey protein concentrates is proposed, which includes the following steps:
(a) Ultrafiltration of whey at a temperature of about 2 to about 25° C. to produce a first retentate R1 and a first permeate P1;
(b) Microfiltration of the retentate R1 from step (a) at a temperature of about 2 to about 35° C. to produce a second retentate R2 and a second permeate P2;
(c) Ultrafiltration of the second permeate P2 from step (b) at a temperature of about 6 to about 25° C. to produce a third retentate R3 and a third permeate P3;
(d) Pasteurization of the retentate R3 from step (c)
(e) Drying of the pasteurized product from step (d).

19 Claims, 1 Drawing Sheet

(51) Int. Cl.
 *A23C 1/04* (2006.01)
 *A23C 9/142* (2006.01)
(52) U.S. Cl.
 CPC ...... *B01D 61/147* (2013.01); *A23C 2210/204* (2013.01); *A23C 2210/208* (2013.01)

(56) References Cited

U.S. PATENT DOCUMENTS

| | | | | |
|---|---|---|---|---|
| 2010/0028525 | A1* | 2/2010 | Lucey | A23C 7/043 426/656 |
| 2014/0296162 | A1* | 10/2014 | Van Der Zande | A23J 3/08 514/21.2 |

FOREIGN PATENT DOCUMENTS

| | | |
|---|---|---|
| EP | 2 679 098 A1 | 1/2014 |
| WO | 96/32021 A1 | 10/1996 |
| WO | 2004/091306 A1 | 10/2004 |
| WO | 2010/005830 A1 | 1/2010 |

* cited by examiner

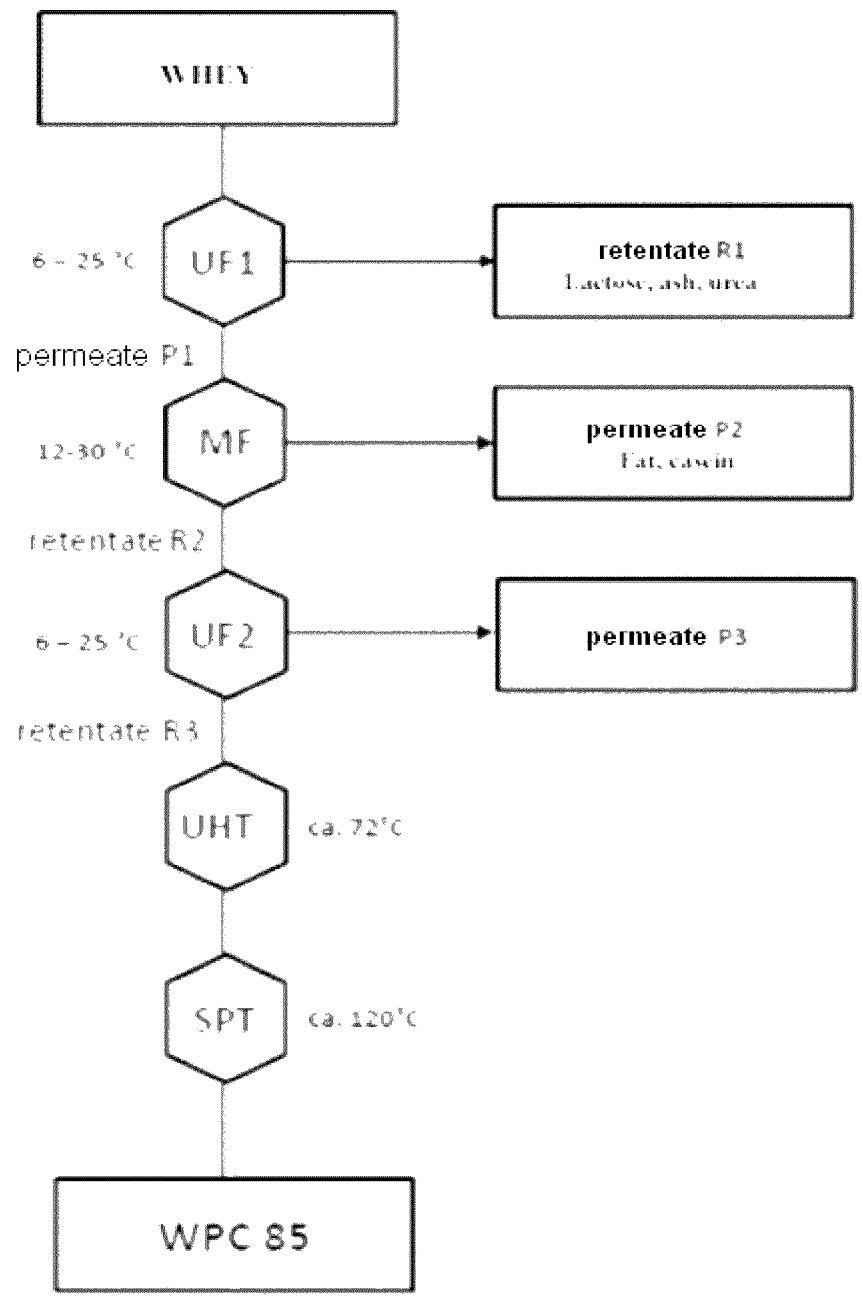

PROCESS FOR THE PRODUCTION OF NEAR STERILE WHEY PROTEIN CONCENTRATES

FIELD OF THE INVENTION

The invention lies in the food technology field and relates to an improved process for the production of whey protein concentrates.

PRIOR ART

For cheese production, a culture (microbes) is added to the milk; as a result, on the one hand souring and on the other hand maturation (aroma formation) of the cheese take place. However, a large part of this culture remains in the whey and is also concentrated in the course of the production process of whey protein concentrates (WPC) by filtration methods. Typical volume concentration factors (VKF or VCF) for the production of whey protein concentrates are: WPC 35-VCF 5-7, WPC 50 VCF 10-15, WPC 60 VCF 20-25, and WPC 80 VCF 35-45. All microbes and spores contained in the whey are also concentrated in the same VCF ratio. Thermophilic microbes are also sometimes used for cheese production.

Further thermophilic microbes and spores reach the milk via the cows' fodder (silage) and are not completely inactivated or removed in the standard processes of the dairy industry; thus these microbes also end up in the milk.

Microbe inactivation by means of temperatures over 85° C. would lead to a disadvantageous denaturation of the whey proteins and hence to a lower quality product. On the other hand, temperatures over 121° C. would be necessary for the inactivation of the thermophilic microbes and spores.

The standard production of whey protein concentrates (WPC 60-90) starts from whey, which is firstly subjected to an ultrafiltration in which lactose, ash and urea are removed with the permeate. The retentate is passed over a heat exchanger at about 55° C. and then subjected to a microfiltration, in which fat and residues of casein are removed with the retentate. A ceramic membrane with a pore size of 0.1 µm is typically used for this. The permeate is once again ultrafiltered, and the third retentate thus arising is processed into a concentrate.

However, the method has two considerable disadvantages: in this case the filtration temperature is about 45 to 55° C. and thus again in the growth optimum of the thermophilic microbes and spores. These grow through the membrane within a few hours, and this in turn leads to deterioration in the microbiological quality of the product. The membrane must be cleaned after about 8 hrs, since it would otherwise become blocked. Furthermore, resulting products are always still microbially contaminated, and hence cannot simply be further used.

In this connection, reference may be made to EP 1314357 A1 (NESTLE), from which a method for the spray drying of milk concentrate with a high dry content through addition of emulsifiers is known.

The subject of DE 10 2004 039 733 A1 (BURGER) is a method for sterilization of milk via ultrafiltration. In this, the cream is previously removed and can be sterilized at higher temperature.

CN 2011 1116530 A1 discloses a method for the production of low temperature milk powder in which skimmed milk is subjected at 40 to 50° C. to a microfiltration through an inorganic membrane with a pore diameter of 0.8 to 1.4 µm. Next, the MF product is sterilized at 72-78° C. and concentrated in a falling film evaporator at 45 to 75° C. This is followed by a spray drying in which the temperature at the inlet is 180 to 200° C. and at the outlet 80 to 105° C.

Finally, from the two documents EP 2679098 A1 and EP 2732706 A1 (DMK), methods for the production of near sterile milk powders with a high whey protein index are known, which also comprise filtration steps and infusion heating.

The purpose of the present invention was to improve the methods of the prior art to the effect that microbiologically acceptable concentrates, i.e. which at least satisfy the legal requirements, are provided, which offer lower costs and higher protein content.

SUMMARY OF THE INVENTION

The present invention relates to a method for the production of near-sterile whey protein concentrates, which comprises the following steps:
(a) Ultrafiltration of whey at a temperature of about 2 to about 25° C. to produce a first retentate R1 and a first permeate P1;
(b) Microfiltration of the retentate R1 from step (a) at a temperature of about 6 to about 35° C. to produce a second retentate R2 and a second permeate P2;
(c) Ultrafiltration of the second permeate P2 from step (b) at a temperature of about 2 to about 25° C. to produce a third retentate R3 and a third permeate P3;
(d) Pasteurization of the retentate R3 from step (c); and
(e) Drying of the pasteurized product from step (d).

BRIEF DESCRIPTION OF THE DRAWING

The invention will be described in greater detail with reference to the accompanying drawing in which the FIGURE schematically illustrates a flow diagram of the process according to the present invention.

DESCRIPTION OF THE INVENTION

The combination of the process steps, in particular the sequence of ultra- and microfiltration steps, which is preferably also still performed at low temperatures, prevents the growth of thermophilic microbes, which cannot be completely killed by heat treatment. Insofar as growth of mesophilic microbes occurs, these are completely removed in the pasteurization step. This leads to a microbially excellent product.

In the following Table A, the typical specification requirements for a near sterile whey protein concentrate and the results achieved with the process according to the invention are summarized:

TABLE A

Specification of near sterile powder

| Microbe species | Method | Requirement | Invention |
|---|---|---|---|
| Mesophilic spores | 10 min 80° C./30° C. | max. 500/g | 100/g |
| Thermophilic spores | a) 10 min 80° C./55° C. b) 30 min 100° C./55° C. | max. 500/g | 100/g |
| Bacillus Cereus | 10 min 80° C./30° C. selective agar | <10/g | <10/g |
| Thermophilic microbes | 55° C. | max. 500/g | 100/g |
| Sulphite-reducing spores | 10 min 80° C./37° C. (MPN selective broth) | max. 10/g | <10/g |

TABLE A-continued

Specification of near sterile powder

| Microbe species | Method | Requirement | Invention |
|---|---|---|---|
| Clostridium perfringens | 10 min/80° C. | max. 10/g to neg/g | <10/g |
| Salmonella | LFGB § 64 modf. | neg in 750-1500 g | neg in 1500 g |
| Enterobacter sakazakii | Selective agar | neg in 375-750 g | neg in 1500 g |

Filtration Steps

The core of the process according to the invention is the sequence of first ultrafiltration, microfiltration and second ultrafiltration. The essential difference between micro- and ultrafiltration lies in the different pore sizes and in the different membrane structure such as the materials and the filter materials involved. A filtration through membranes with a pore size <0.1 μm is as a rule described as ultrafiltration, while filtration at pore sizes >0.1 μm is usually described as microfiltration. In both cases, purely physical, i.e. mechanical membrane separation processes are involved, which operate on the principle of mechanical size exclusion: all particles in the fluids which are larger than the membrane pores are held back by the membrane. The driving force in both separation processes is the differential pressure between inflow and outflow of the filter surface, which lies between 0.1 and 10 bar. Depending on the use field, the material of the filter surface can consist of stainless steel, plastic, ceramic or textile fabric. There are various forms of filter element: cartridge filters, flat membranes, spirally wound modules, bag filters and hollow fibre modules which are all in principle suitable in the sense of the present invention.

In the dairy industry, the preconception has long prevailed that for the removal or microorganisms in milk fractions the pore diameter should in general not be below a value of 0.5 μm. However, the invention includes the discovery that for the production of a microbially excellent whey protein concentrate a diameter in the range from 0.8 to even 1.6 μm and preferably 1.1 to 1.4 μm in the microfiltration step is entirely sufficient, if the majority of the microbes have previously been removed by ultrafiltration. In combination of this comparatively larger pore diameter with a microfiltration unit which essentially consists of a ceramic membrane, the problem of frequent blocking is simultaneously solved.

Furthermore, there is the preconception that the removal of microbes by means of filtration steps requires a temperature of at least 55° C., since only under these conditions can adequate throughputs of about 450 to 550 l/m² hr be achieved, while at temperatures of for example 20 to 30° C., only flows of at most 100 l/m² hr can be achieved. Hot filtration has however the substantial disadvantage that after about 4 hours filtration time, the heat-resistant microbes and spores begin to grow through the membrane and to proliferate again in the permeate. In the context of the process according to the invention, a particular advantage therefore consists in that the ultrafiltration is performed in the cold, that is at 4 to 25 and in particular 6 to 12° C. and the microfiltration also at low temperatures of about 6 to about 30° C. and in particular about 12 to about 25° C., since the growing through of the microbes is in this way prevented and surprisingly a flow rate of 200 to 300 l/m² hr is nonetheless achieved.

Pasteurization

The heat treatment of the permeate from the last filtration step preferably takes place in heat exchangers, for which plate heat exchangers in particular have proved especially suitable. A temperature gradient is present on the heat exchangers, which is however selected such that the permeate is heated to a temperature of about 70 to 80° C. and in particular about 72 to 74° C. for a residence time of at least 20 and at most 60 seconds, preferably about 30 seconds.

Direct Steam Injection

In a first alternative embodiment, the permeate can also be pasteurized by Direct Steam Injection (DSI). This has the advantage that the slow passage through a temperature range in which mesophilic and thermophilic spores find optimal growth conditions is significantly shortened by flash heating. This is achieved by the direct injection of hot or even superheated steam, which can have a temperature of 100 to about 250° C. This is usually effected by means of nozzles which either dip directly into the product or are built into a side arm of the heat exchanger.

The principle of DSI consists in that a superheated jet of steam under pressure is passed into a nozzle chamber and then decompresses through a perforated pipe ("radial steam jet diffuser") into the liquid product to be heated. The high pressure flow creates a rapidly expanding radial heat exchange field as a result of which uniform heating of the product is achieved in very short periods.

As explained at the start, the purpose consists in adjusting the milk product to an exact temperature in a very short time, preferably 1 to about 5 seconds and in particular 1 to 2 seconds. For this, it is necessary to pass a precise as possible a volume of steam into the product at high speed. If the steam volume is controlled via a pressure reducing valve, the velocity of the steam as a rule falls below the speed of sound, which leads to the product not heating up sufficiently fast. In order to prevent this, in the sense of the process according to the invention, the steam is preferably fed in under so-called "choke-flow" conditions, since this makes it possible to introduce the steam even at ultrasonic velocity directly into the product to be heated. This is understood to be the phenomenon of increasing the steam velocity by creating a pressure difference by mans of a special nozzle. Suitable components are for example obtainable commercially from the firm ProSonics.

DSI requires no preheating of the substance used, i.e. the permeate from step (c) can be used directly. However, the smaller the temperature differences are, the more precise is the temperature control.

Infusion

In a second alternative embodiment, the permeate can also be pasteurized by (steam) infusion. This process has been known since the 1960's. Essentially, the heating can be performed in two steps, wherein the material to be heated is sprayed into a pressure chamber filled with hot steam and the heating or pasteurization takes place as the droplets fall. However, since the year 2000, the so-called PDX process has gained in importance. In this, the material to be heated is vaporized and abruptly heated in a flow of superheated steam. The steam flow advancing at ultrasonic velocity homogeneously distributes the product droplets so that a multiphase flow is created, in which the heating gently takes place only at the boundaries of the droplets. In this way, condensation of the droplets is also effected. Here the steam can have a temperature of about 100 to about 250° C. and in particular about 120 to about 150° C., and the infusion requires a time typically of 1 to 5 and in particular about 2 to 3 seconds.

In a further preferred configuration, the infusion heating takes place in such a manner that product and steam are alternately sprayed into a reactor via concentric annular nozzles, so that a steam pressure gradient from inside to outside is produced. As a result, the droplets are held away from the walls and cannot overheat.

Flash Cooling

It is likewise desirable during the cooling also to pass through the temperature range critical for microbial growth as quickly as possible. For this, flash cooling has proved especially effective. This is understood to mean a process in which the hot liquid product is "flashed" under turbulent flow conditions into a reactor which is under reduced pressure, so that the boiling point of water is lowered below 30° C. In support, the jacket of the flash reactor can additionally be further cooled. The cooling of the pasteurized product requires about 1 to 5 seconds, with the final temperature usually lying at about 25 to about 30° C.

Drying

The drying of the pasteurized product can be effected in a manner known per se. Preferably spray drying is used for this, wherein the temperature in the inlet is typically about 180 to about 260° C. and at the outlet about 80 to about 105° C. Low temperatures are preferred since in this way the danger of the proteins denaturing is decreased. Alternatively, the products can also be dewatered by freeze-drying.

Further additives, such as for example lecithins, vitamins or food emulsifiers [EP 1314367 A1, NESTLE] and the like, can also be added to the homogenized concentrates before the spraying.

The whey protein concentrates obtained in this manner have a protein content of at least 60 wt. % and preferably about 65 to about 90 wt. % and in particular about 70 to about 85 wt. %.

The process is shown again schematically in FIG. 1. The meanings of the abbreviations in this are:
UF1=1$^{st}$ ultrafiltration
MF=microfiltration
UF2=2$^{nd}$ ultrafiltration
UHT=ultra-high temperature heating=pasteurization
SPT=spray drying
MPC85=whey protein concentrate with 85 wt. % protein content

EXAMPLES

Example 1

1,000 kg of whey were subjected to an ultrafiltration at a temperature of 8° C., in which a spiral wound membrane with a pore diameter of 0.05 μm was used. Lactose, ash and urea were removed with the permeate and discarded, while the retentate, after passage through a heat exchanger in which it was preheated to 25° C., was fed into a microfiltration. Here a ceramic membrane with a pore diameter of 1.1 μm was used. The retentate, which contained fat and casein, was discarded, while the permeate at 25° C. was subjected to a second ultrafiltration, which once again was performed with a spiral wound membrane with a pore diameter of 0.05 μm. The permeate was discarded, but the retentate was fed into a pasteurization in an ultra high temperature heater, in which it was heated to 72° C. in 30 seconds. Next, the pasteurized product was transferred into a spray tower, in which with an inlet temperature of 200 to 220° C. (outlet temperature: 80° C.) it was freed from water. Ca. 4.5 kg of a sterile, pourable whey protein concentrate were obtained, which had a protein content of 85 wt. %. The service life of the microfiltration membrane here was at least 24 hours.

Example 2

Example 1 was repeated, but the pasteurization performed by means of a DSI. For this hot steam at 220° C. was injected into the product for 2 seconds, as a result of which it heated up to ca. 75° C.

Comparative Example V1

1,000 kg of whey were fed at a temperature of 8° C. into a plate heat exchanger and heated to 55° C. Next the product was subjected to an ultrafiltration in which a spiral wound membrane with a pore diameter of 0.05 μm was used. Lactose, ash and urea were removed with the permeate and discarded, while the retentate was fed into a microfiltration. Here a ceramic membrane with a pore diameter of 1.1 μm was used. The retentate, which contained fat and casein, was discarded, while the permeate still at 55° C. was subjected to a second ultrafiltration, which once again was performed with a spiral wound membrane with a pore diameter of 0.05 μm. The permeate was discarded, but the retentate fed into a pasteurization in a high temperature heater, in which it was heated to 72° C. in 30 seconds. Next, the pasteurized product was transferred into a spray tower, in which with an inlet temperature of 200 to 220° C. (outlet temperature: 80° C.) it was freed from water. Ca. 4.5 kg of a sterile, pourable whey protein concentrate were obtained, which had a protein content of 67 wt. %. The service life of the microfiltration membrane was however only 6 hours, after which the process had to be interrupted and the membrane cleaned.

Example 1 shows that, in comparison with the prior art, according to the process according to the invention a larger quantity of concentrate with higher protein content is obtainable and this is associated with the additional advantageous effect of markedly longer membrane service lives.

The invention claimed is:

1. A process for the preparation of whey protein concentrates low in germs, comprising the following steps:
    (a) ultrafiltrating whey at a temperature of about 2 to about 25° C. to produce a first retentate R1 and a first permeate P1;
    (b) microfiltrating said first retentate R1 from step (a) using a microfiltration membrane having an average pore diameter of from about 0.8 μm to about 1.6 μm at a temperature of from about 6 to about 35° C. to obtain a second retentate R2 and a second permeate P2;
    (c) ultrafiltrating said second permeate P2 from step (b) at a temperature of from about 2 to about 25° C. to obtain a third retentate R3 and a third permeate P3;
    (d) pasteurizing said third retentate R3 from step (c); and
    (e) drying said pasteurized product from step (d) to obtain a whey protein concentrate.

2. The process of claim 1, wherein the ultrafiltration in step (a) is performed at temperatures in the range from about 2 to about 15° C.

3. The process of claim 1, wherein the ultrafiltration in step (a) is performed with membranes having an average pore diameter of about 0.01 to about 0.1 μm.

4. The process of claim 1, wherein the microfiltration is performed at a temperature in the range from about 6 to about 30° C.

5. The process of claim 4, wherein the microfiltration is performed at a temperature in the range from about 12 to about 25° C.

6. The process of claim 1, wherein the ultrafiltration in step (a), the microfiltration in step (b) and the ultrafiltration in step (c) are performed using membranes made from material selected from the group consisting of stainless steel, polymer, ceramic and textile fabric.

7. The process of claim 1, wherein the ultrafiltration in step (a) is performed using cartridge filters, flat membranes, spiral wound modules, bag filters or hollow fibre modules.

8. The process of claim 1, wherein the pasteurization is performed at a temperature in the range from about 70 to about 80° C.

9. The process of claim 1, wherein the pasteurization is performed over a period of 1 to 2 seconds or about 20 to about 60 seconds.

10. The process of claim 1, wherein the pasteurization is performed by Direct Steam Injection (DSI) or steam infusion and optionally subsequent flash cooling.

11. The process of claim 1, wherein the pasteurized product from step (d) is spray dried.

12. The process of claim 11, wherein the spray drying is performed at a temperature of about 80 to about 260° C.

13. The process of claim 1, wherein whey protein concentrates which have a protein content of at least 65 wt. % are prepared.

14. The process of claim 11, wherein whey protein concentrates which have a protein content of about 65 to about 90 wt. % are prepared.

15. The process of claim 1, wherein the ultrafiltration in step (c) is performed at temperatures in the range from about 2 to about 15° C.

16. The process of claim 1, wherein the ultrafiltration in step (c) is performed with membranes having an average pore diameter of about 0.01 to about 0.1 µm.

17. The process of claim 1, wherein the microfiltration in step (b) is performed using cartridge filters, flat membranes, spiral wound modules, bag filters or hollow fibre modules.

18. The process of claim 1, wherein the ultrafiltration in step (c) is performed using cartridge filters, flat membranes, spiral wound modules, bag filters or hollow fibre modules.

19. The process of claim 1, wherein whey protein concentrates which have a protein content of about 70 to about 85 wt. % are prepared.

* * * * *